Feb. 26, 1952 R. H. SWARTZ 2,587,073
COMPOUND RECIPROCATING-PULSE JET AIRCRAFT POWER PLANT
Filed Aug. 24, 1949 3 Sheets-Sheet 1

INVENTOR.
ROBERT H. SWARTZ
BY
Peter Fries, Jr.
ATTORNEY

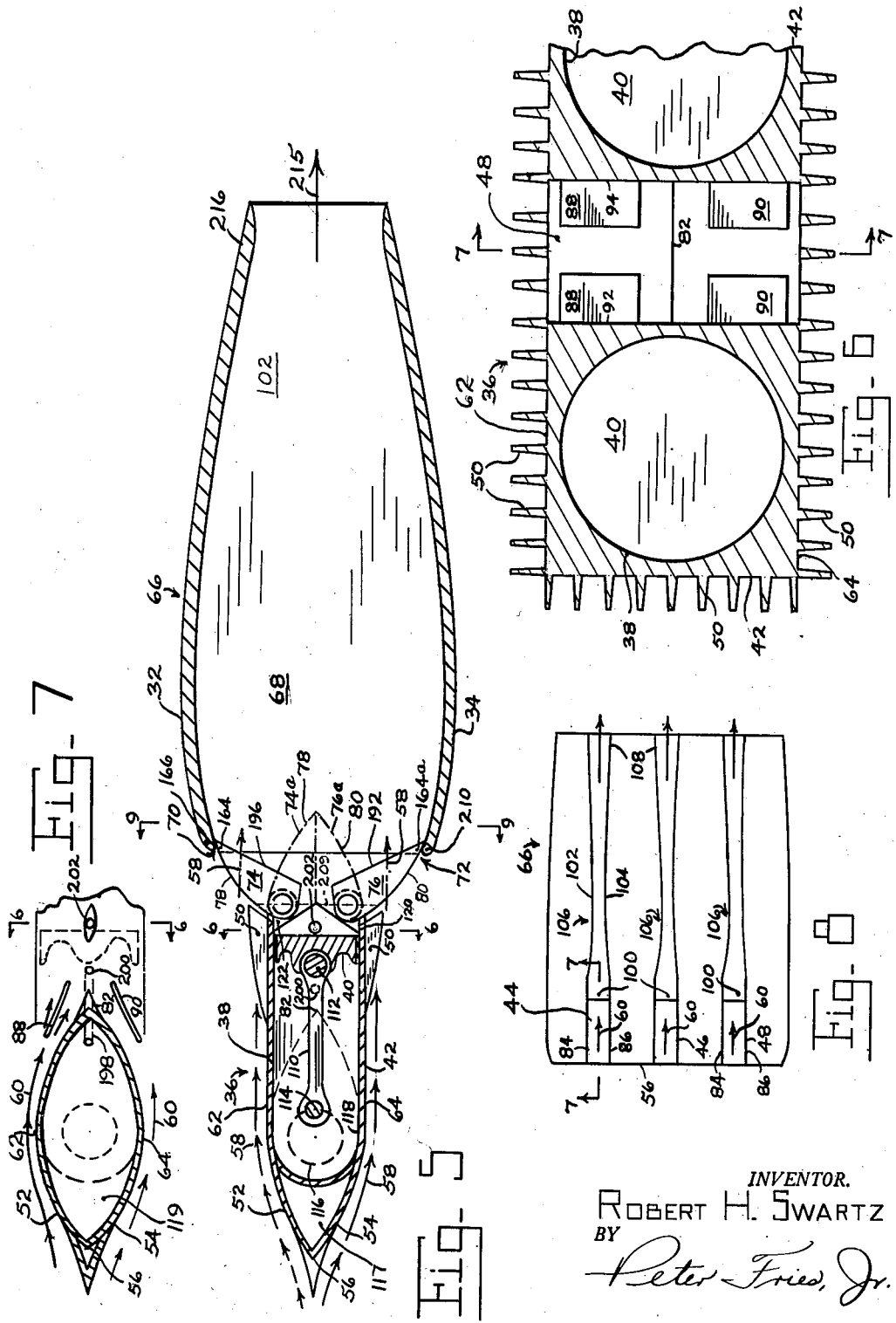

Feb. 26, 1952 R. H. SWARTZ 2,587,073
COMPOUND RECIPROCATING-PULSE JET AIRCRAFT POWER PLANT
Filed Aug. 24, 1949 3 Sheets-Sheet 3

INVENTOR.
ROBERT H. SWARTZ
BY
Peter Fries, Jr.

Patented Feb. 26, 1952

2,587,073

UNITED STATES PATENT OFFICE 2,587,073

COMPOUND RECIPROCATING-PULSE JET
AIRCRAFT POWER PLANT

Robert H. Swartz, New York, N. Y.

Application August 24, 1949, Serial No. 112,044

5 Claims. (Cl. 60—35.6)

This invention relates to aircraft and the engines for propulsion thereof.

An object of the invention is to provide an aircraft in which the propulsive means partakes of the advantages inherent in the reciprocating power plant and also those inherent in use of reaction propulsion means.

Another object of the invention is to provide an aircraft propulsion device in which an internal combustion engine supplies combustible mixtures to a reaction engine to produce a reactive thrust for the aircraft.

A further object of the invention is to provide an aircraft propulsion device which is adapted to utilize the normally wasted exhaust gases from an internal combustion engine, for powering a reaction engine, so as to vastly increase the efficiency of utilization of the energy contained in the original fuel, and the overall efficiency of the aircraft propulsion device itself.

Still another object of the invention is to provide a two stage aircraft propulsion device, including in one stage a reciprocating internal combustion engine, and in the other stage a reaction engine, and including novel means and a novel valve controlled coupling means therebetween, whereby extremely high efficiency of the system is attained, with entirely automatic cooperation between the two stages of the device.

A further object of the invention is to provide a novel construction of interstage valve-like coupling means for use between an internal combustion reciprocating engine stage and a reaction engine stage of a power system, wherein the high pressure gases produced in the reciprocating engine stage are adapted to actuate the interstage valve-like coupling means to allow the gases to pass into the reaction engine stage to power the same, for further combustion therein, to produce a reactive thrust.

Another object of the invention is to provide a novel form of power plant in which fuel forming part of a combustible mixture is first burned in a reciprocating internal combustion engine, producing high pressure high temperature gases, and, upon reaching a predetermined pressure during the combustion portion of the cycle of the reciprocating engine, is then automatically conducted into the combustion chamber of a reaction engine closely coupled to the reciprocating engine, and there intermixed with gases under pressure and again subjected to combustion, producing high pressure therein at high efficiency and is conducted to a reaction nozzle for producing a reactive thrust.

Still another object of the invention is to provide a novel form of pulse-jet power plant having a combustion chamber which is supplied with combustible fuel components which have been pre-compressed and pre-ignited at least in part, in a reciprocating engine cylinder, and in which the cylinder head opens when a predetermined cylinder pressure is reached, to afford direct communication with the combustion chamber for the entry of these pre-ignited and pressurized fuel components and gases into the combustion chamber, therein to be further processed and wherein the combustion thus initiated in the cylinder, is continued and carried out at high efficiency in the combustion chamber, with suitable admixture therein with oxygen containing gases to enhance the combustion, and producing upon discharge from the combustion chamber a considerable gaseous jet discharge stream.

Other objects and advantages of the invention will become apparent from the following description of a preferred embodiment thereof as illustrated in the accompanying drawings, and in which:

Figure 5 is a longitudinal sectional elevation such as might be seen on plane 5—5 of Figure 1, and corresponding to plane 5—5 of Figure 4.

Figure 6 is a fragmentary transverse sectional elevation taken on plane 6—6 of Figures 5 and 7.

Figure 3:
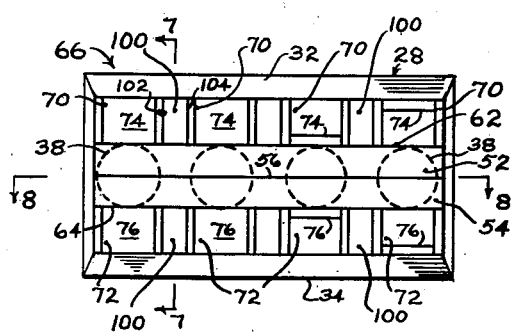
Figure 3 is a front elevation taken on plane 3—3 of Figure 1, showing the forward end of one of the power units employed on the aircraft.
Figure 7:
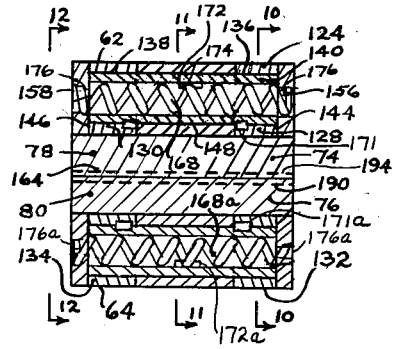

Figure 7 is a fragmentary longitudinal sectional elevation taken on plane 7—7 of Figure 6, and also corresponding to plane 7—7 of Figures 3 and 8.

Figure 8 is a sectional plan view taken on plane 8—8 of Figure 3, omitting the details of the portions of the engine apart from the cooling air vents, and intended to illustrate mainly the cooling air vents in relation to the entire engine.

Figure 10:
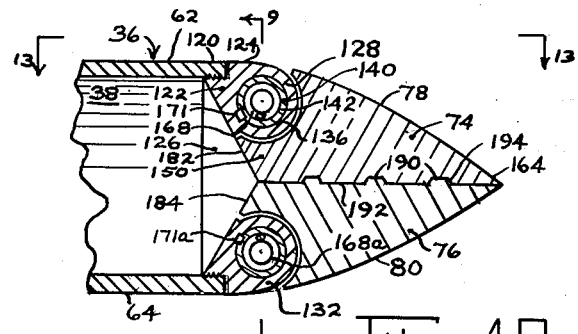
Figure 13:
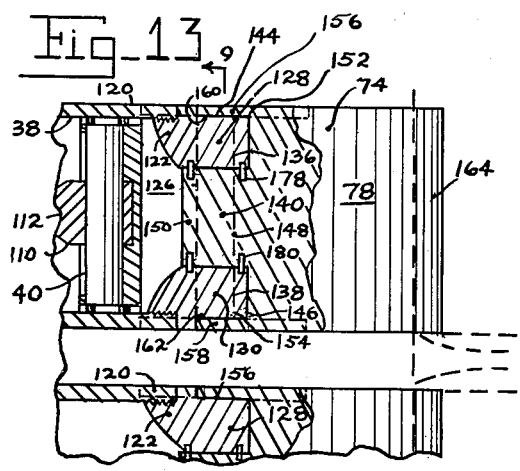

Figure 9 is a sectional elevation taken on plane 9—9 of Figures 5, 10 and 13.

Figure 10 is a sectional elevation taken on plane 10—10 of Figure 9.

Figure 11:
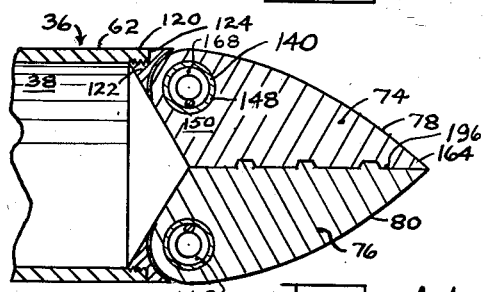

Figure 11 is a sectional elevation taken on plane 11—11 of Figure 9.

Figure 12:
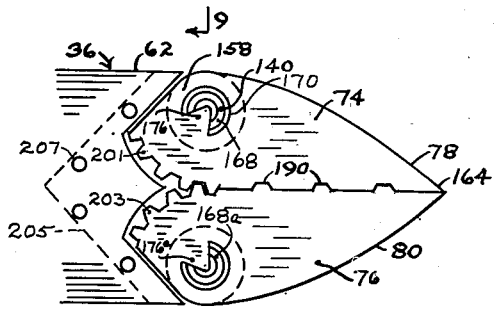

Figure 12 is an elevational view taken on plane 12—12 of Figure 9.

Figure 13 is a partly sectioned plan view taken on plane 13—13 of Figure 10.

Figure 14:
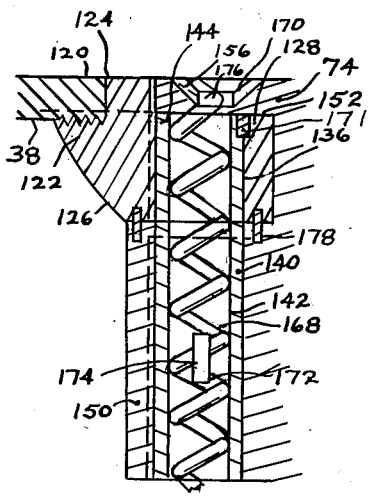

Figure 14 is an enlarged fragmentary detail view of the central portion of Figure 13.

Where internal combustion engines of the reciprocating type have been used, it has been difficult to extract from the fuel a large part of the energy contained therein, and as a result, as much as forty per cent of the available energy in the fuel may be exhausted to atmosphere, entirely unused and wasted. On the other hand, it is similarly impossible, when employing the reaction type motors, to utilize all the available energy in the fuel either, where the combustion must take place, if at all, in the combustion chamber usually provided for that purpose, and hence a large proportion of the discharge from the reaction engine comprises unburned fuel components and a waste of the energy contained therein.

According to the present invention, the good features of both the reciprocating engine and the reaction engine are selected and combined into my novel and improved power system. Accordingly, I employ an internal combustion engine which exhausts into a combustion chamber of a reaction engine, such as one of the pulse-jet type, the exhaust or expelled gases mixing with the compressed air in the pulse-jet chamber and causing a second combustion to take place therein, producing high pressure gases the energy of which is converted in the jet nozzle into a high efficiency rearward thrust for the craft being propelled thereby.

I employ a novel form of construction, in which the cylinder head of the reciprocating stage of the engine automatically opens when a predetermined gas pressure has been reached in the cylinder, affording direct communication with the interior of the reaction combustion chamber for the flow of the pressurized partly burned gases from the cylinder right into the combustion chamber. Upon opening in this manner, the parts of the cylinder head simultaneously close the air intake ports of the combustion chamber through which fresh air has been forced under the influence of the forward motion of the aircraft, and a thorough intermixture of this air and the partly consumed pre-pressurized gases from the cylinder takes place in the combustion chamber of the reaction stage of the motor. Upon ignition of this high pressure readily combustible mixture in the combustion chamber, a large volume of highly pressurized gases is produced with a high degree of efficiency in the conversion of inherent energy of the mixture into pressure energy, and this is then converted into a propulsion thrust of considerable magnitude upon discharge through the jet nozzle.

When the gases from the pulse-jet combustion chamber have been expelled through the jet nozzle, a decrease of pressure in the combustion chamber allows the parts forming the cylinder head to resume their positions as the cylinder head, simultaneously unblocking the fresh air intake ports of the combustion chamber to allow fresh air to enter the same in preparation for the next cycle.

In order to understand clearly the nature of the invention, and the best means for carrying it out, reference may now be had to the drawings, in which like numerals denote similar parts throughout the several views.

Figure 1:
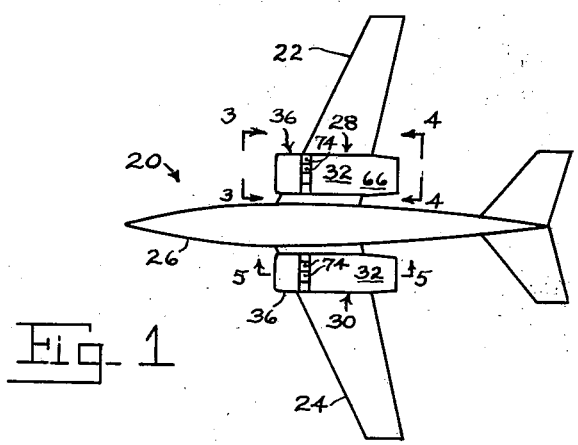
Figure 1 is a top plan view of an aircraft which is propelled by a power system according to the invention.
Figure 2:
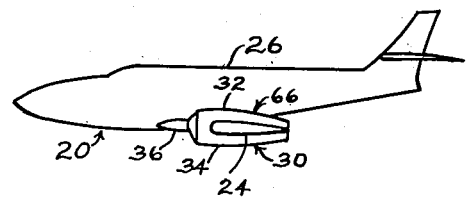
Figure 2 is a side elevation of the aircraft shown in Figure 1.

Referring first to Figures 1 and 2, there is an airplane 20, with wings 22 and 24 of the cantilever type extending out of the fuselage or body 26. The aircraft shown is of the low-wing monoplane type, with conventional tail fins and rudder, but it will be understood that a power plant or engine of the type described herein may be used in connection with any form of aircraft, the one shown being only by way of illustration.

Upon the wings 22 and 24 are mounted the reaction power plants or engines, 28 and 30 respectively, the engines being similar in construction although mounted on opposite wings. Hence, throughout the specification, whenever engine 28 is mentioned, it will be understood that engine 30 is also meant, and vice versa. Although the engines 28 and 30 may be distinctly separate from the wings, and merely carried thereby, they are preferably mounted integral with the wings, in the manner illustrated, for efficient streamlining and balance, the necessary structural design being well known and hence not illustrated in detail, otherwise than to mention that the wing struts and supports must not interfere with the arrangement and construction of the engines themselves.

The engine 28 thus includes a housing enclosing the engine parts, and including a top wall 32 and a bottom wall 34 between which are disposed the combustion chambers of the reaction stage of the motor, and also includes a forward housing 36 in which is disposed the reciprocating engine portion of the motor. In the motor 28 illustrated, there is a bank of four cylinders 38 within each of which is a reciprocating piston 40. The cylinders 38 are disposed in cylinder blocks 42, as shown best in Figures 5 and 6, with passageways formed as at 44, 46, and 48 between adjacent cylinder blocks to permit the passage of cooling air around the cylinders. In addition, fins 50 radiate outwardly from the outer surfaces of the cylinder blocks as seen best in Figures 5 and 6, to provide additional cooling effect.

The forward portion, that is to say, the left end portion as seen in Figures 5 and 7, of the housing 36 in which the cylinders are disposed, is streamlined in the manner shown, by suitably rounding and curving the forward walls 52 and 54 thereof, which converge smoothly to meet along the horizontal joint line 56. As the aircraft moves toward the left in Figures 1, 2, 5 and 7, it is seen that the contour of the outer surface of the housing 36 will cause the air stream to flow thereover in the direction of the arrows 58 in Figure 5, and the arrows 60 in Figure 7. In other words, the power plant is so arranged as to make maximum use of the cooling effect of the air through which the aircraft is propelled.

At the same time, it is seen that the vertical extent of the cylinder housing 36, that is, between its top surface 62 and its lower surface 64, is much less than the vertical extent of the bank 66 of combustion chambers of the reaction engine stage of the power plant, that is, the vertical distance between the furthest spaced portions of the top and bottom surfaces 32 and 34 respectively of the combustion chamber, as seen in Figure 5. Since the frontal area presented by the cylinder housing 36 is so small relatively, a large amount of air is enabled to flow in the direction of the arrows 58 as seen in Figure 5, right into the combustion chamber 68 shown in that view, through the upper and lower openings or fresh air inlets 70 and 72, when the upper and lower air inlet valve gates 74 and 76 are in retracted position, unlocking the said air inlets, that is, at dotted line positions 74a and 76a. In addition, when in such unblocking positions, the curved valve gate surfaces 78 and 80 of the valve gates allow the fresh air to enter the combustion chambers without any turbulence, for maximum air intake efficiency.

The housing 36 shown has four cylinders 38 as mentioned above, which are spaced from each other by air cooling passageways through which the cooling air flows in the direction of the arrows 60 as seen best in Figure 7. The walls 62 and 64 of the housing 36 are accordingly sloped downwardly and upwardly respectively, as seen in Figure 7, to converge smoothly to the intersection line 82, this convergence only occurring between adjacent cylinders, that is to say, between each pair of adjacent lines 84 and 86 defining the horizontal limits or width of the cooling air passageways 44, 46 and 48 shown in Figure 8.

The cylinders 38 are of course formed in the cylinder blocks 42 which, as seen best in Figure 6, are conveniently rectangular in cross section although their outer contour may also be cylindrical if desired, and in such case, the cooling fins 50 would radiate outwards on radii of the center of the circular bores 38. As shown in Figures 6 and 7, upper and lower deflector plates or guide plates 88 and 90 are carried on the inner faces 92 and 94 respectively of adjacent cylinder blocks, within the cooling air passageways, the guide plates being smoothly curved in the manner of Figure 7, to aid in conducting the cooling air stream into the open ends 100 of the air passageways which extend all the way through the reaction engine stage 66 of the power plant, between each pair of adjacent combustion chamber walls such as those shown at 102 and 104, in Figure 8.

Figure 4:
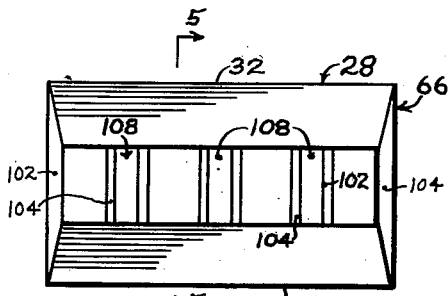
Figure 4 is a rear elevation taken on plane 4—4 of Figure 1, showing the rearward or jet discharge end of one of the power units employed on the aircraft.

From Figure 8, it is also seen that the combustion chamber walls 102 and 104 converge smoothly to form a constriction or throat at 106, the venturi effect producing an accelerated flow of the cooling airstream therethrough toward the smoothly divergent discharge end 108 of the passageways. From Figures 3 and 4, it is also seen that the side walls 102 and 104 are substantially vertical.

Referring again to Figures 5 and 6, it is seen that inside each cylinder bore 38 there is a piston 40 which is adapted to reciprocate therein, the piston being pivotally engaged with the connecting rod 110 by means of the wrist pin 112. The leftward end of the connecting rod 110 pivotally engages the crank pin 114 of the crank shaft 116 which rotates about its axis, and has end trunnions, not shown, and intermediate bearing portions, which are journaled in bearings formed in the walls of the cylinder housing 36 at convenient locations. The crankcase 118 may be lubricated in any convenient and well known manner, to provide lubrication to the various bearings and moving parts shown and to the cylinder walls along which the piston 40 is slidable. Piston rings may be carried by the piston 40 to minimize gas leakage into the crankcase, or to eliminate it.

Referring now to Figures 9 through 13, it is seen that the cylinders 38 of the reciprocating engine-like portion of the power plant are each threaded internally at their rightward ends 120 to threadedly receive the reduced inner ends 122 of the annular cylinder heads 124, there being one cylinder head for each of the four cylinders. The cylinder head 124 has an axial bore or opening 126 through which the high pressure gases produced in the cylinder upon combustion in part of the fuel-air mixture therein, will flow directly into the reaction engine stage combustion chambers 68 when the valve gates 74 and 76 open outwards to afford direct communication between each cylinder 38 and the combustion chamber 68 which it feeds.

The cylinder head 124 has a pair of upper bearing projections or studs 128 and 130, and a pair of lower bearing projections or studs 132 and 134, which project outwardly toward the right as seen in Figures 10 and 13. The upper bearing studs 128 and 130 have axially aligned bearing bores 136 and 138 formed therethrough to receive a hollow axle tube 140 having an axial bore 142. It will be noted that the length of the hollow axle tube 140 is equal to the distance between the outer ends 144 and 146 of the support studs 128 and 130 respectively, and that it is seated in such manner that its central portion bridges across the intervening space between the studs 128 and 130.

The upper valve gate 74 has an opening or bore 148 formed through its central extension 150 in alignment with the bores formed through the support studs 128 and 130 of the cylinder head, to receive the central portion of the hollow axle tube 140 so as to be supported thereon and so as to pivot about the axis thereof. The upper gate valve 74 being notched out at 152 and 154 to receive the support studs 128 and 130, it is seen that the side ears 156 and 158 of the gate valve 74 remain and extend into the correspondingly recessed portions 160 and 162 of the cylinder head. The gate 74 is thus free to turn about the axis of the axle tube 140 between its extended position shown in full lines in Figure 5, and its retracted or cylinder head closed position shown in dotted lines in that view.

When in extended position, it is seen that the outer marginal surface portion 164 of the valve gate 74 bears firmly against the lip 166 of the fresh air intake opening 70 of the combustion chamber 68, so as to block entrance of fresh air into the combustion chamber, and that direct access between the interior of the cylinder 38 and the combustion chamber 68 is afforded for the flow of high pressure partly consumed gases into the combustion chamber 68.

A helical torsion spring 168 is disposed inside the bore of the axle tube 140 and has its ends extending beyond the outer ends of the axle tube and into recesses 170 formed in the inner surfaces of the ears 156 and 158 of the valve gate 74. The ends of the torsion spring 168 are clamped or welded into these recesses in the gate ears, so as to be securely held thereby and hence to be movable therewith as the valve gate 74 turns about its axis. The axle tube 140 is held by keys 171 as seen best in Figure 10 within the support lugs 128 and 130 so as to remain stationary relative thereto and to block turning motion therein. The valve gate 74 thus pivots upon the central portion of the axle tube intermediate the support lugs 128 and 130. Now the central portion of the torsion spring 168, as at 172 in Figures 9 and 14, is held securely by means of a clamp 174 welded to the inside of the axle tube 140, so as to be immovable relative thereto.

As a result, it is seen that when the upper valve gate 74 is moved from its dotted line position 74a in Figure 5 to its full line extended position in the same figure, the effect is to torsionally stress the spring 168, to bias it back toward its cylinder head closed position shown in dotted lines and to tend to hold it closed firmly against the corresponding lower valve gate 76. The spring 168 thus acts to keep the upper gate 74 in cylinder-head-closed position, and the corresponding spring 168a similarly acts upon the lower valve gate 76 to bias it into cylinder head closed position.

The clamps 176 may be used to hold the outer ends of the torsion spring securely and immovably within the recesses 170 of the two ears of the upper valve gate 74. As seen in Figure 12, these clamps 176 on the upper gate and 176a on the lower gate, may be lugs integral with the ear walls of the gates, and bent around the underlying ends of the torsion springs 168 and 168a respectively. Or, for adjustment of the tension of the springs, the clamps may comprise U-bolts the web portions of which extend around and grip the ends of the springs 168 and 168a respectively, and the legs of the U-bolts extending through the walls of the lugs 176 and 176a respectively, and held by nuts threaded thereon. To block leakage of any of the high pressure gases, annular sealing rings 178 and 180 may be placed as shown best in Figure 13, in annular recesses formed in abutting surfaces of the lugs supporting the gates 74 and 76, and the central portion of the gate, with a rather snug fit being desired to avoid leakage, providing a tortuous passageway in any event to minimize any possible leakage.

The inner surfaces 182 and 184 of the upper and lower valve gates 74 and 76 are inclined as shown. These surfaces 182 and 184 guide the gas and vapor outflux into the reaction chamber 68 in a somewhat narrow stream and are laid out nozzle-like for this purpose, as seen also in Figure 5 in solid lines. When starting the engine, as described more fully below, the resultant stream of gas and vapor rushes through the reaction chamber 68 and is discharged by the jet nozzle 216, suffering no substantial loss of energy on the way. Sealing ribs 190 are carried on the upper surface 192 of the lower valve gate 76, extending right across the surface, and have their protruding portions slightly tapered as shown to fit snugly into the matching recesses 194 in the lower surface 196 of the upper valve gate 74 when in engaged position as in Figure 10.

Fuel and air may be fed or injected into the cylinders 38 by any suitable means, as by means of a duct 198 leading to the opening or fuel intake port 200 in the surface of the cylinder 38, which is so positioned as to be uncovered when the piston 40 moves to the left as seen in Figure 5. This combustible mixture having been fed into the cylinder, the piston on its upstroke compresses the same, and then at or near the top of the stroke, it is ignited by means of the spark plug 202, resulting in the production of high pressure high temperature gases to the left of the closed cylinder head, the valve gates 74 and 76 being in their closed dotted line positions shown in Figure 5.

The pressure of the burning gases in the cylinder rises sufficiently to overcome the torsion of the helical springs 168 and 168a which normally serve to bias the upper and lower valve gates 74 and 76 into closed position, forcing them apart so that they move into their full line positions shown in Figure 5, with their outer margins 164 and 164a respectively, bearing against the lips 166 and 210 of the combustion chamber 68, so as to block further entrance therein of fresh air from the outside through the fresh air intake ports of the combustion chamber 68. The burning gases having passed into the combustion chamber 68 from the cylinder, combine with the compressed rammed fresh air which was forced therein by the high speed forward motion of the aircraft, and continue to burn, the additional compressed rammed fresh air thoroughly intermixing therewith to form a highly combustible mixture. The result is to produce high pressure gases in combustion chamber 68, which then flow out of the combustion chamber 68 toward the right in Figure 5, to produce a reactive thrust in the direction of the arrow 215 as it passes through the jet nozzle 216.

The piston 40 in the meantime goes toward the left as seen in Figure 5, and the reduction of pressure in the combustion chamber 68 allows the valve gates 74 and 76 to return to cylinder head closed positions, and then the cycle starts over again. The four cylinders with their individual combustion chambers 68 fire in turn, according to any pre-selected firing order, and thus a continuous series of jet thrusts to the rear is maintained. Methods of timing the firing and firing order of multi-cylinder internal combustion engines are quite well known in the art, and hence will not be described in detail, except that, as is well known, ignition is effected by means of a spark applied inside the cylinder upon the compression of the combustible air-fuel mixture inside the cylinder by the piston, and the spark may come from a common high tension ignition coil through a distributor which conducts the high tension voltage to the cylinders at the proper time and in accordance with their firing order.

The internal combustion reciprocating engine portion of the power plant is thus a four cycle, air cooled engine. The speed of the reciprocating engine portion is substantially constant. The air speed may however, be governed by advancing or retarding the spark timing, regulating the amount of fresh air entering into cylinder, or by increasing or decreasing the rate of fuel feed to the reciprocating internal combustion engine portion, or by a combination of the above.

From Figure 5, it is seen that the walls of the cylinders of the reciprocating engine stage of the power plant are of maximum inside bore diameter to afford the greatest ratio of compression possible, and this will result in producing more and higher pressure gases for increased efficiency, to be fed into the combustion chamber 68 of the reaction engine stage. The valve gates 74 and 76 may be hollow and filled with a cooling liquid such as liquid sodium to carry the heat from the inside to the outside of the valve gates.

It will be further seen that the engine housing, including that of the reciprocating engine stage of the power plant, may be extended on the sides to permit incorporation of auxiliary equipment, such as superchargers, fuel pumps, generators, spark distributors, induction coils, and the like, while remaining suitably streamlined. Also the hollow spaces shown at 117 and 119 in Figures 5 and 7 may be adapted to furnish room to accommodate such equipment.

With regard to the operation of the valve gates 74 and 76, it will be seen that vibration and wear on the valve is reduced to a minimum because as the valve opens, the helical twist spring is subjected to more and more tension, thus braking the momentum of the valve gates as the springs 168 and 168a are thus tensioned. Also there is a decrease of pressure on the cylinder side of the valve gates 74 and 76 as the gas is expelled. This ever decreasing pressure plus the increasing tension of the helical twist springs, slows down the opening speed of the valves; also, the expansion of burning gas within the pulse-jet chamber 68 is partially offset by the fresh air pressure at the intake ports 70 and 72 from the outside as the aircraft moves rapidly forward.

From Figure 5, it is clear that the longer well curved surfaces 78 and 80 of the valve gates 74 and 76 are so shaped as to permit only a minimum "drag" or friction on the air stream entering the pulse jet chamber 68 through the air induction ports 70 and 72, thus increasing the speed of the entering fresh air. The valves 74 and 76 are cooled by the fresh air stream as it passes over the cylinder into the pulse-jet chamber 68, and thus heat is conducted from the internal or cylinder side of the valves.

The momentum of the valve gate closing will be greatly reduced because it will be timed to close as the piston 40 approaches the top of its upstroke. Thus, a bit before the valve is in the closed position, a pressure will be created within the cylinder as the valve gates move into valve closed position, slightly compressing any gas in their paths back into the cylinder, and this pressure will act as a cushion to reduce the impact of the valve gates closing upon each other, and thus will reduce shock and wear.

With this type of power plant, a much higher ratio of compression in the cylinder is possible, without unduly strengthening the cylinder walls or having present the always bothersome "knock," since, upon ignition, the expanding gas is permitted to be expelled through the valve opening as the valve gates 74 and 76 move to open position, automatically upon the pressure within the cylinder reaching the predetermined level.

The inside diameter of the cylinder bores is enlarged to increase the ratio of compression. It is also enlarged to permit an even flow and smooth air stream, hence greater volumetric efficiency, into the pulse jet chamber 68.

The cooling fins are cast with the cylinder wall for cooling and strengthening purposes as illustrated, and are placed in a longitudinal position, parallel with the air stream generally, being curved in such a manner as to force the air stream around the inaccessible parts of the cylinder wall to carry off heat therefrom. The pulse-jet is so designed that it will "pulsate" or burn its partly consumed gas and fuel and air mixture on being primed by the expelled exhaust gas from the internal combustion engine stage of the power plant.

To insure a sufficient amount of air pressure in the pulse-jet chamber 68 before combustion, a ratio between the open area of the intake and the open area of the exhaust must be selected, in accordance with well known principles of design. Also, it is known that the shorter the reaction chamber 68, the higher the resonant frequency and, conversely, the longer the tube 68, the lower the resonant frequency thereof. Therefore, to gain the highest efficiency for this compound engine, the maximum air speed of the aircraft should be assumed. Next, the resonant frequency of the tube 68 should be designed to operate a bit slower than the combustion engine exhausting into the reaction chamber 68, so that combustion therein cannot occur only on air pressure plus unburned residual gases therein, but would require in addition the priming from the cylinder 38 with a charge of exhausted partly consumed gas and fuel mixture.

Hence the internal combustion reciprocating engine stage may always turn at the same speed. The tube or pulse-jet chamber 68, at maximum air speed, will build up an air pressure and be primed at a predetermined number of times per minute. Since the momentum is a function of the product of the mass of the gases escaping and their velocity, optimum efficiency would make the velocity of the airplane equal to the velocity of the exhaust gases from the reaction chamber 68. It will be seen that the larger the exhaust opening 216, the quicker the gases can exhaust therefrom, thus permitting a greater number of pulsations per second. The present invention, priming the reaction chamber 68 with the expanding gases from the internal combustion chambers or cylinders 38 of the reciprocating engine stage, which are expelled into the reaction chamber 68, makes a closer realization of this desired optimum condition possible.

The air passages between the pulse jet chambers 68, already described in Figure 8, serve to prevent pre-combustion due to excessive heating of the jet chambers which might otherwise occur.

The cycle of operation of the power plant will now be described briefly, by reference to a single section of the plant, comprising, as seen in Figure 5, a cylinder 38 with piston 40 reciprocating therein, the valve gates 74 and 76 being pivoted in the cylinder head and normally held in closed dotted line positions by the helical springs 168 and 168a, the reaction chamber 68 having the fresh air intake ports 70 and 72 which are thus open when the valve gates are in closed dotted line position.

With the piston 40 in its leftward position, and commencing its compression upstroke, the valve gates 74 and 76 are in closed position, fuel and air have been introduced into the cylinder 38, and ignition takes place by the spark plug 202 at the top of the compression upstroke. Combustion takes place, and high pressure gases are formed in the space between the piston and the cylinder head which is closed by the mating valve gates 74 and 76. As the pressure in the cylinder increases, the tension of the helical valve closing springs 168 and 168a is overcome, pushing open the valve gates 74 and 76 to their solid line positions, with their edges 164 and 164a thrown and held against the lips 166 and 210 respectively of the upper and lower fresh air intake ports of the reaction chamber 68.

The partly consumed high pressure gases rush out of the cylinder 38 and into the reaction chamber 68, the fresh air ports of which remain closed, while the piston 40 moves leftwardly on its downstroke. These partly consumed mixed high pressure gases and air fuel mixture from the cylinder mix with the air which has been rammed or compressed into the reaction chamber 68 by the forward motion of the aircraft while its fresh air intake ports were open, and combustion continues within the reaction chamber 68 at high efficiency, as a result, producing a large volume of high pressure gases therein, the high pressure continuing to hold the valve gates 74 and 76 firmly against the lips 166 and 210 of the fresh air intake ports. The high pressure gases flow rearwardly, rightwardly as in Figure 5, out of the reaction chamber 68 through its jet nozzle 216, producing a high pressure high velocity jet thrust to propel the aircraft.

After a period of time, which may be very short, and due to discharge of gases through the jet nozzle 216, the pressure within the reaction chamber 68 will decrease, allowing the valve closing springs 168 and 168a to act to close the valve gates 74 and 76, that is, moving them toward their dotted line positions shown in Figure 5. At the same time, the piston 40 is moving through its upstroke, toward the right again, scavenging the gases and unconsumed fuel mixture from the cylinder into the reaction chamber 68. As the piston 40 continues its upstroke, and the valve gates 74 and 76 are moving toward closed position, it is seen that the remaining unscavenged gases and vapors in the cylinder are being somewhat compressed thereby, so as to cushion the shock of the two valve gates coming together, thus saving wear and tear and shock.

The valve gates 74 and 76 being now in valve closed position, fresh air is free to again enter the reaction chamber 68 through the two fresh air intake ports 70 and 72, being compressed or rammed therein due to the forward motion of the aircraft. At the same time, the piston 40 moves toward the left again as seen in Figure 5, allowing fresh fuel and air to enter the cylinder 38 through the port 200 or several such ports, provided for that purpose, under the influence of pressure from fuel injection pumps and air compressors as desired.

The valve gates 74 and 76 still being in closed positions, that is, dotted lines as seen in Figure 5, the piston 40 moves toward the right as seen in that view, on its compression upstroke, compressing the mixture of fuel and air in the cylinder, in the space between the piston and the cylinder head which is thus closed by the valve gates 74 and 76 pivoted therein. At the top of the compression stroke of the piston 40, the spark plug 202 is actuated, and the combustible compressed mixture in the cylinder is ignited, and commences to burn, producing high pressure gases sufficient to throw open the valve gates 74 and 76, allowing the partly consumed high pressure gases and vapors in the cylinder to rush into the reaction chamber 68, for intermixture with the fresh air charge already therein, so that combustion continues and at high efficiency, producing a large volume of high pressure gases for discharge through the jet nozzle 216 to produce the reactive thrust for the aircraft.

To regulate the cylinder pressure at which the valve gates 74 and 76 will be thrown open, it will be understood that the opposite ends of the springs 168 and 168a may be adustably clamped in the recesses 170 inside the projections 156 and 158 as seen in Figures 9, 10, 13 and 14, so that the tension on the springs will be neither too great nor too little. In other words, the clamps 176 which grip the ends of the springs and are engaged with the recesses 170 may be so arranged that they may be movable to various positions along the length of the recesses 170 to draw the ends of the springs with them and hold them in such positions, adjusting the spring tension in this manner. Suitable openings may be made in the walls of the recesses 170 to afford adjustment access to the spring ends and the clamps 176 for this purpose.

To start the power plant, we may have a starter comprising an electric motor attached to the crankshaft to turn it, commencing the firing of the reciprocating engine portion or stage. The valve gates 74 and 76 then open and the gases from the cylinder 38 flow right through the combustion chamber and out the jet nozzle, creating a thrust. This causes the aircraft to move, and the regular cycle as already described, continues thereupon.

Since the power plant incorporates four reciprocating cylinders in each engine, it is seen that where two such engines are employed, as seen in Figure 1, on each side of the fuselage, the firing order of the two power plants should match, as measured outwardly from the center line of the aircraft fuselage, to avoid unbalanced turning thrusts.

Although I have described my invention in specific terms, it will be understood that various changes may be made in the size, shape, materials and arrangement without departing from the spirit and scope of the invention as claimed.

As seen best in Figure 12, it is desirable for the upper and lower valve gates 74 and 76 of any cylinder 38 to move in unison, that is, to open and close together, and this is done by forming gear teeth 201 and 203 in the lower leftward surfaces of the end ear walls 156 and 158 of each of the gates 74 and 76, for mutual engagement, so that if one gate moves, the other valve gate must move with it. A cover plate 205 may be secured in screw recesses 207 by screws to cover this gearing. Referring to Figure 5, it is seen that, to avoid sidewise leakage of gases when the valve gates 74 and 76 are in open full line position, the side walls 102 and 104 of the combustion chambers 68 extend leftwardly to line 209 substantially, being curved on top and bottom conforming to the solid lines 78 and 80.

I claim:

1. A propulsion device comprising at least one cylinder, a piston movable in said cylinder, a crankshaft mounted for rotation about an axis perpendicular to the axis of said cylinder, a connecting rod pivotally engaging said piston and said crankshaft at its respective ends, means for admitting a combustible mixture into said cylinder, said piston being movable to compress said combustible mixture, means for igniting said compressed combustible mixture whereby high pressure gases are produced upon the combustion at least in part of said mixture in said cylinder, a reaction housing having a combustion chamber, normally closed valve means communicating between said cylinder and said combustion chamber, fresh air induction means communicating with the interior of said combustion chamber and being normally open to allow fresh air to enter the same, means linking said cylinder valve means communicating with said combustion chamber and said fresh air induction means whereby upon the opening of communication by said valve between said cylinder and said combustion chamber, said fresh air induction means is moved to closed position, and whereby upon the closing of communication by said valve between said cylinder and said combustion chamber, said fresh air induction means is moved to open position, and whereby, upon entry of the said high pressure gases and partly consumed combustible mixture from the cylinder into said combustion chamber it is there intermixed with the fresh air therein and the combustion thereof continues, to produce high pressure high temperature gases in the combustion chamber, jet nozzle discharge outlet means forming an outlet for said high pressure gases from said combustion chamber, whereby a reactive thrust is produced, and wherein said fresh air induction means comprises a pair of air intake ports formed in a wall of said combustion chamber and disposed in the air stream of fresh air through which the aircraft moves, and adapted when open, to allow fresh air to be rammed into said combustion chamber directly, as a result of such movement, and in which said normally closed valve means communicating between said cylinder and said combustion chamber comprises a pair of valve gates pivoted in said cylinder head and constructed and arranged that when in valve closed position said valve means blocks communication between said cylinder and said combustion chamber, and unblocks said pair of air intake ports, and when in valve open position, said valve means unblocks communication between said cylinder and said combustion chamber, and blocks entry of fresh air through said air intake ports into said combustion chamber, and in which said resilient bias of said valve means allows said valve gates to move to valve closed position when the pressure within said combustion chamber has fallen to a predetermined level.

2. The construction according to claim 1, wherein means is provided for constraining said valve gates to move in unison.

3. The construction according to claim 1, wherein said pair of valve gates comprises upper and lower valve gates, and wherein said upper valve gate carries a series of teeth projecting therefrom, a second series of teeth projecting from said lower valve gate and intermeshing with said first series of teeth on said upper valve gate, whereby, upon movement of either of said valve gates, the other valve gate is constrained to move at the same time.

4. The construction according to claim 1, wherein said pair of valve gates comprises upper and lower valve gates, and wherein said upper valve gate carries a plurality of ear walls, a first series of spaced teeth projecting from each of said ear walls, a second plurality of ear walls carried by said lower valve gate, and a second series of spaced teeth projecting from each of said second ear walls and intermeshing with the corresponding series of teeth on said first ear walls, whereby upon movement of either of said valve gates, the other is constrained to move in unison.

5. A propulsion device comprising at least one cylinder, a piston movable in said cylinder, a crankshaft mounted for rotation about an axis perpendicular to the axis of said cylinder, a connecting rod pivotally engaging said piston and said crankshaft at its respective ends, means for admitting a combustible mixture into said cylinder, said piston being movable to compress said combustible mixture, means for igniting said compressed combustible mixture whereby high pressure gases are produced upon the combustion at least in part of said mixture in said cylinder, a reaction housing having a combustion chamber, normally closed valve means communicating between said cylinder and said combustion chamber, fresh air induction means communicating with the interior of said combustion chamber and being normally open to allow fresh air to enter the same, means linking said cylinder valve means communicating with said combustion chamber and said fresh air induction means whereby upon the opening of communication by said valve between said cylinder and said combustion chamber, said fresh air induction means is moved to closed position, and whereby upon the closing of communication by said valve between said cylinder and said combustion chamber, said fresh air induction means is moved to open position, and whereby, upon entry of the said high pressure gases and partly consumed combustible mixture from the cylinder into said combustion chamber it is there intermixed with the fresh air therein and the combustion thereof continues, to produce high pressure high temperature gases in the combustion chamber, jet nozzle discharge outlet means forming an outlet for said high pressure gases from said combustion chamber, whereby a reactive thrust is produced, and wherein said fresh air induction means comprises a pair of upper and lower air intake ports formed in the forward wall of said combustion chamber and disposed in the path of the fresh air stream, so as to receive fresh air rammed into the combustion chamber when open, and in which said cylinder has a cylinder head secured thereon, with an opening formed in said cylinder head communicating between said cylinder and said combustion chamber, a pair of upper and lower projections integral with said cylinder head and spaced from each other, one such pair of projections being directly below the other such pair, upper and lower valve gates having respective projecting portions extending between each such pair of upper and lower projections on said cylinder head, an upper hollow shaft penetrating said upper pair of projections and the said projecting portion of said upper valve gate therebetween, a helical spring disposed in said hollow shaft with its ends engaging outer portions of said upper valve gate and an intermediate portion thereof engaging said cylindrical hollow shaft so as to be stationary relative to said hollow shaft at said intermediate portion, a lower hollow shaft penetrating said lower pair of projections and the said projecting portion of said lower valve gate therebetween, a lower helical spring disposed in said lower hollow shaft with its ends engaging outer portions of said lower valve gate and with an intermediate portion thereof engaging said hollow shaft so as to be stationary relative thereto at said intermediate portion, said hollow shafts being secured to said upper and lower projections so as to be stationary relative thereto, whereby, upon increase of said cylinder pressure above a predetermined level, said pressure overcomes said spring bias normally closing said valve gates together, and forces them apart into valve open position.

ROBERT H. SWARTZ.

REFERENCES CITED

The following references are of record in the file of this patent:

UNITED STATES PATENTS

| Number | Name | Date |
| --- | --- | --- |
| 1,305,340 | Bostedo | June 3, 1919 |
| 1,493,157 | Mèlot | May 6, 1924 |
| 2,342,262 | Franz et al. | Feb. 22, 1944 |
| 2,372,058 | Campbell | Mar. 20, 1945 |
| 2,480,626 | Bodine | Aug. 30, 1949 |

FOREIGN PATENTS

| Number | Country | Date |
| --- | --- | --- |
| 390,256 | France | July 23, 1908 |